United States Patent
Pavlin et al.

(10) Patent No.: US 10,805,099 B2
(45) Date of Patent: Oct. 13, 2020

(54) INTERLACING METHODS, COMPUTER-READABLE MEDIA, AND INTERLACING DEVICES

(71) Applicant: RAZER (ASIA-PACIFIC) PTE. LTD., Singapore (SG)

(72) Inventors: Ludmila Veronica Pavlin, Concord, CA (US); Luke James Baldwin-Brown, Palo Alto, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 72 days.

(21) Appl. No.: 15/777,157

(22) PCT Filed: Nov. 18, 2015

(86) PCT No.: PCT/SG2015/050456
§ 371 (c)(1),
(2) Date: May 17, 2018

(87) PCT Pub. No.: WO2017/086876
PCT Pub. Date: May 26, 2017

(65) Prior Publication Data
US 2018/0337796 A1 Nov. 22, 2018

(51) Int. Cl.
*H04L 12/18* (2006.01)
*G06Q 50/00* (2012.01)
*H04L 29/06* (2006.01)
*H04M 1/725* (2006.01)

(52) U.S. Cl.
CPC ......... *H04L 12/1813* (2013.01); *G06Q 50/01* (2013.01); *H04L 65/4076* (2013.01); *H04M 1/72552* (2013.01)

(58) Field of Classification Search
CPC ............ H04L 12/1813; H04L 65/4076; H04M 1/72552; G06Q 50/01
See application file for complete search history.

(56) References Cited

U.S. PATENT DOCUMENTS

| | | |
|---|---|---|
| 8,473,553 B2 | 6/2013 | McDevitt et al. |
| 8,924,217 B2 | 12/2014 | Moore et al. |
| 9,021,372 B2 | 4/2015 | Anderson |
| 9,077,804 B2 | 7/2015 | Kannan et al. |

(Continued)

FOREIGN PATENT DOCUMENTS

| | | |
|---|---|---|
| CN | 104202473 A | 12/2014 |
| KR | 10-2012-0109710 A | 10/2012 |

OTHER PUBLICATIONS

Examination Report dated Mar. 15, 2019, 7 pages, for the corresponding European Patent Application No. 15908901.0.

(Continued)

*Primary Examiner* — Thomas J Dailey
*Assistant Examiner* — Lam H Duong
(74) *Attorney, Agent, or Firm* — Polsinelli PC

(57) ABSTRACT

A method and device for interlacing data from multiple disparate broadcast and streaming services that allow for the determination of duplicates in the data from the different services. The duplicates can be determined by comparing the information accompanying the data from the different services and then removed to provide interlaced data. A user may selectably output the interlaced data together with original data from the different services.

18 Claims, 15 Drawing Sheets

(56) References Cited

U.S. PATENT DOCUMENTS

| | | | |
|---|---|---|---|
| 10,362,133 B1* | 7/2019 | Maag | H04L 67/06 |
| 2003/0229884 A1 | 12/2003 | Carr et al. | |
| 2004/0078444 A1 | 4/2004 | Malik | |
| 2007/0133509 A1 | 6/2007 | Da Palma et al. | |
| 2007/0186007 A1 | 8/2007 | Field et al. | |
| 2007/0288560 A1 | 12/2007 | Bou-Ghannam et al. | |
| 2009/0119606 A1 | 5/2009 | Gilbert | |
| 2010/0203908 A1* | 8/2010 | Jeong | H04M 1/72552 455/466 |
| 2010/0245533 A1 | 9/2010 | Lee et al. | |
| 2013/0069969 A1 | 3/2013 | Chang | |
| 2014/0032692 A1 | 1/2014 | Klassen | |
| 2014/0040784 A1 | 2/2014 | Reza Behforooz et al. | |
| 2014/0074952 A1* | 3/2014 | White | G06Q 10/107 709/206 |
| 2014/0123014 A1 | 5/2014 | Keen | |
| 2014/0143680 A1 | 5/2014 | Angarita | |
| 2014/0173430 A1 | 6/2014 | Clavel et al. | |
| 2014/0195675 A1* | 7/2014 | Silver | H04W 56/0005 709/224 |
| 2014/0215361 A1* | 7/2014 | Hwang | H04L 12/1818 715/758 |
| 2014/0282083 A1 | 9/2014 | Gaetano, Jr. et al. | |
| 2015/0039711 A1 | 2/2015 | Anderson | |
| 2015/0169538 A1 | 6/2015 | Reynolds et al. | |
| 2016/0315900 A1* | 10/2016 | Rowny | H04L 45/24 |

OTHER PUBLICATIONS

Extended European Search Report dated Jul. 10, 2018, 7 pages, for the corresponding European Patent Application No. 15908901.0.

International Search Report and Written Opinion, dated Jul. 28, 2016, for the corresponding International Application No. PCT/SG2015/050456 in 8 pages.

Office Action (including English Translation) dated Mar. 31, 2020, for the corresponding Taiwanese Application No. 105130443 in 11 total pages.

* cited by examiner

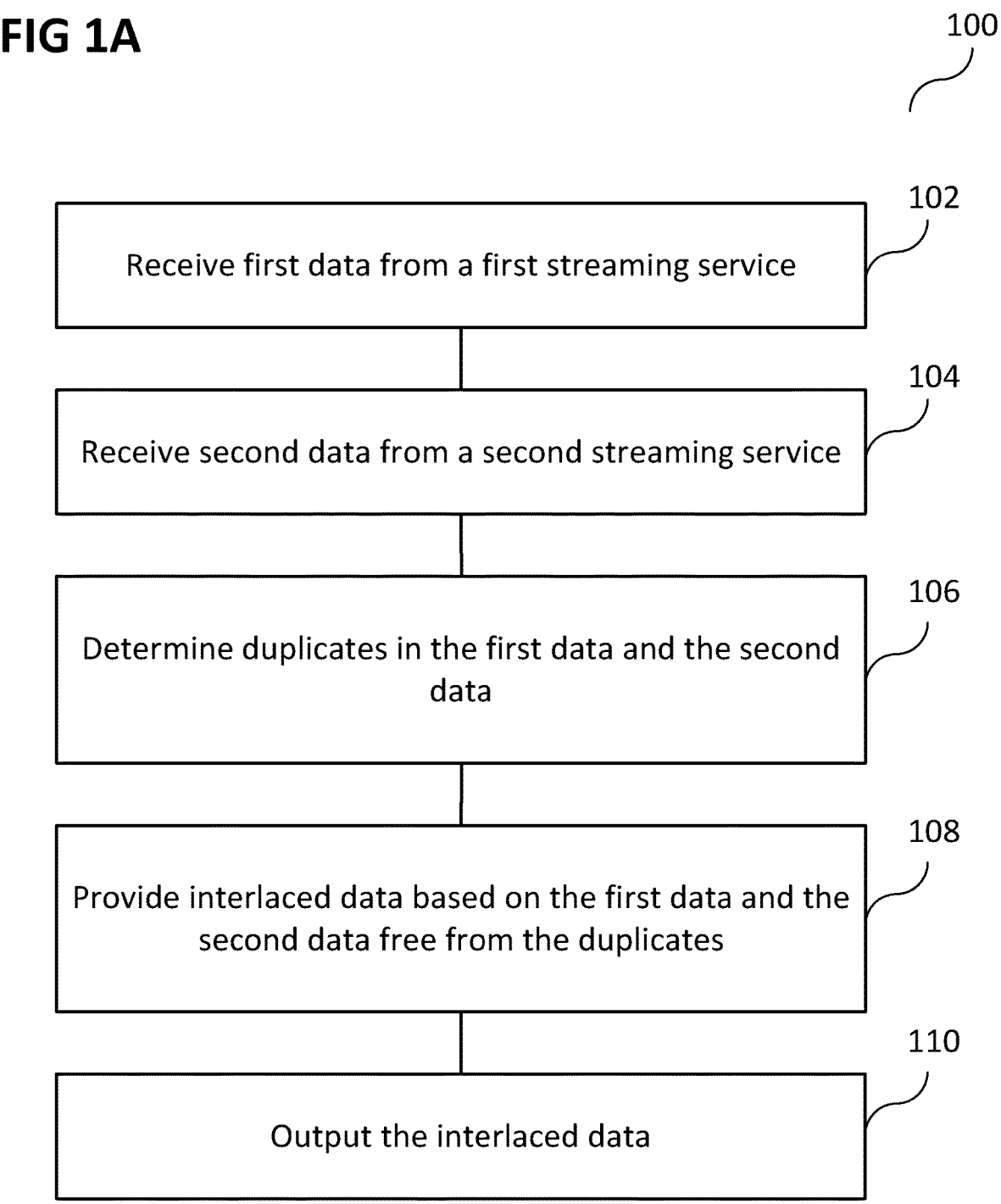

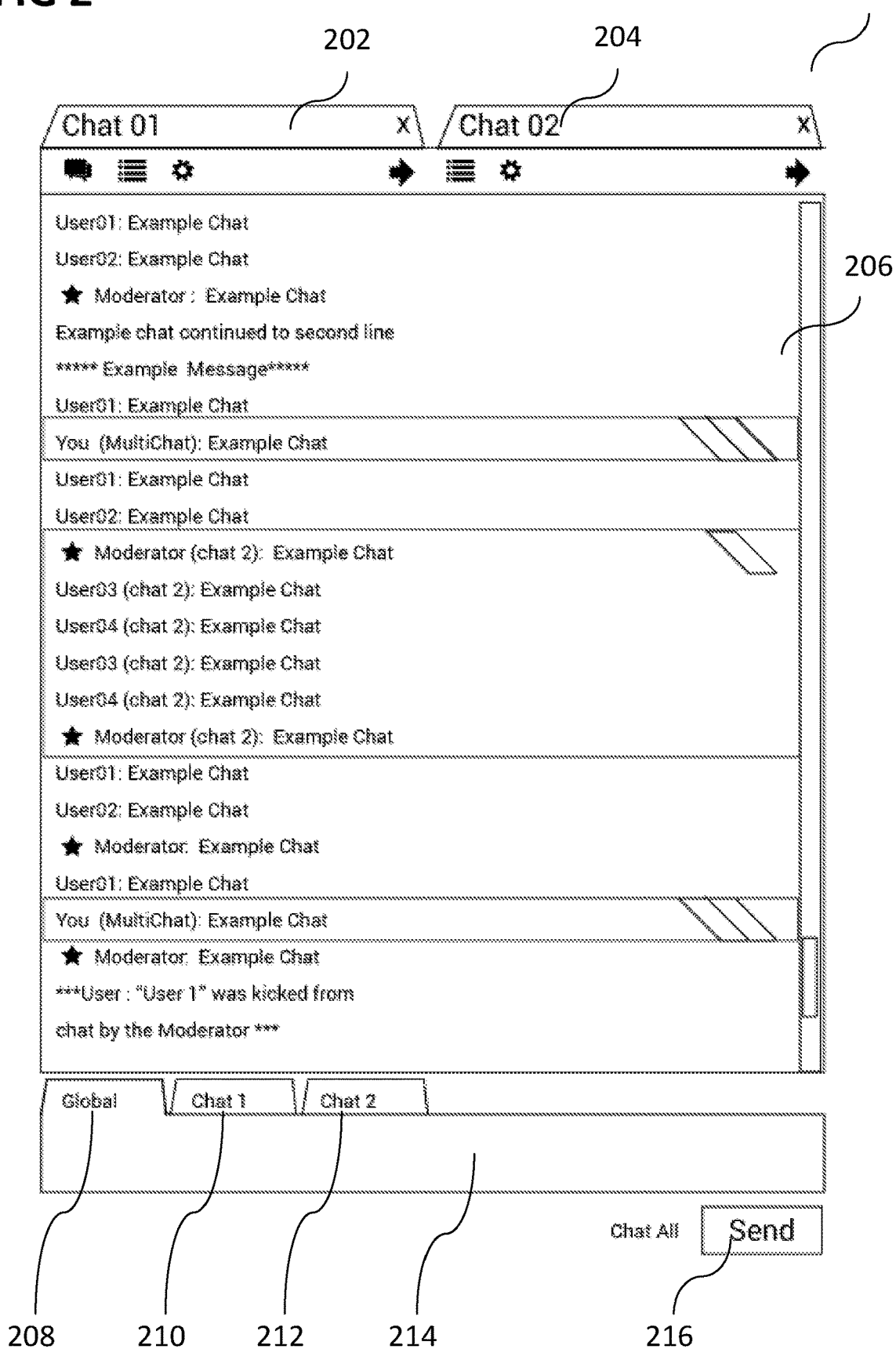

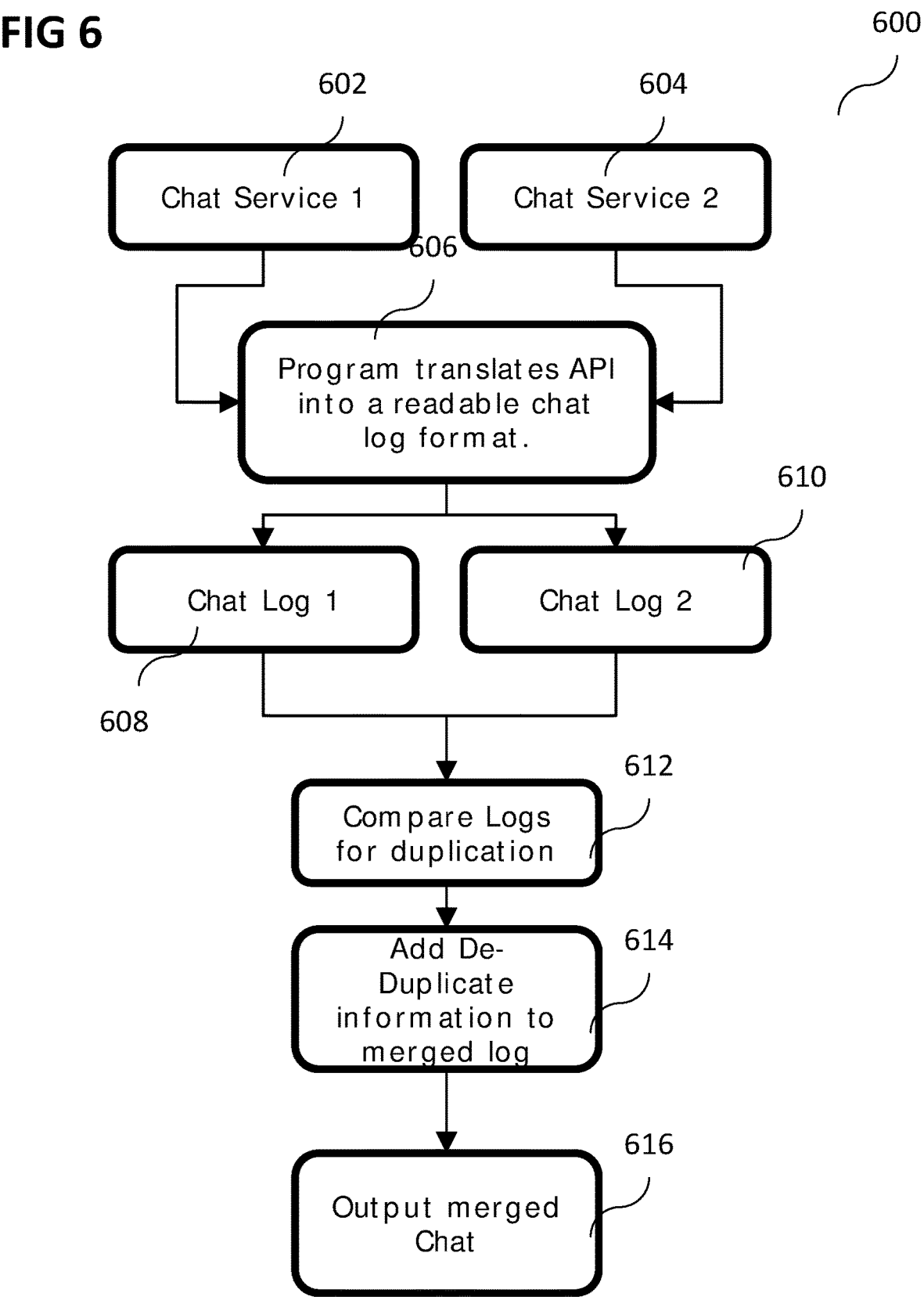

INTERLACING METHODS, COMPUTER-READABLE MEDIA, AND INTERLACING DEVICES

TECHNICAL FIELD

Various embodiments generally relate to interlacing methods, computer-readable media, and interlacing devices.

BACKGROUND

When using chat applications, users face several problems. For example, while watching multiple streams that have individual chat channels, a user must switch between windows to read all the chats. Furthermore, while simulcasting on multiple services, a broadcaster may wish to interact with all audiences. Thus, there may be a need for improved chat applications.

SUMMARY OF THE INVENTION

According to various embodiments, an interlacing method may be provided. The interlacing method may include: receiving first data from a first streaming service; receiving second data from a second streaming service; determining duplicates in the first data and the second data; providing interlaced data based on the first data and the second data free from the duplicates; and outputting the interlaced data.

According to various embodiments, a computer-readable medium may be provided. The computer-readable medium may include instructions which, when executed by a computer, make the computer perform an interlacing method, the interlacing method including: receiving first data from a first streaming service; receiving second data from a second streaming service; determining duplicates in the first data and the second data; providing interlaced data based on the first data and the second data free from the duplicates; and outputting the interlaced data.

According to various embodiments, an interlacing device may be provided. The interlacing device may include: a communication circuit configured to receive first data from a first streaming service and to receive second data from a second streaming service; a determination circuit configured to determine duplicates in the first data and the second data; an interlacing circuit configured to provide interlaced data based on the first data and the second data free from the duplicates; and a user interface circuit configured to output the interlaced data.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 1A shows a flow diagram illustrating an interlacing method according to various embodiments;

FIG. 2 shows an illustration of a user interface for a chat application according to various embodiments;

FIG. 6 shows an illustration of a structure of an interlacing program according to various embodiments;

DETAILED DESCRIPTION

Figure 1B:
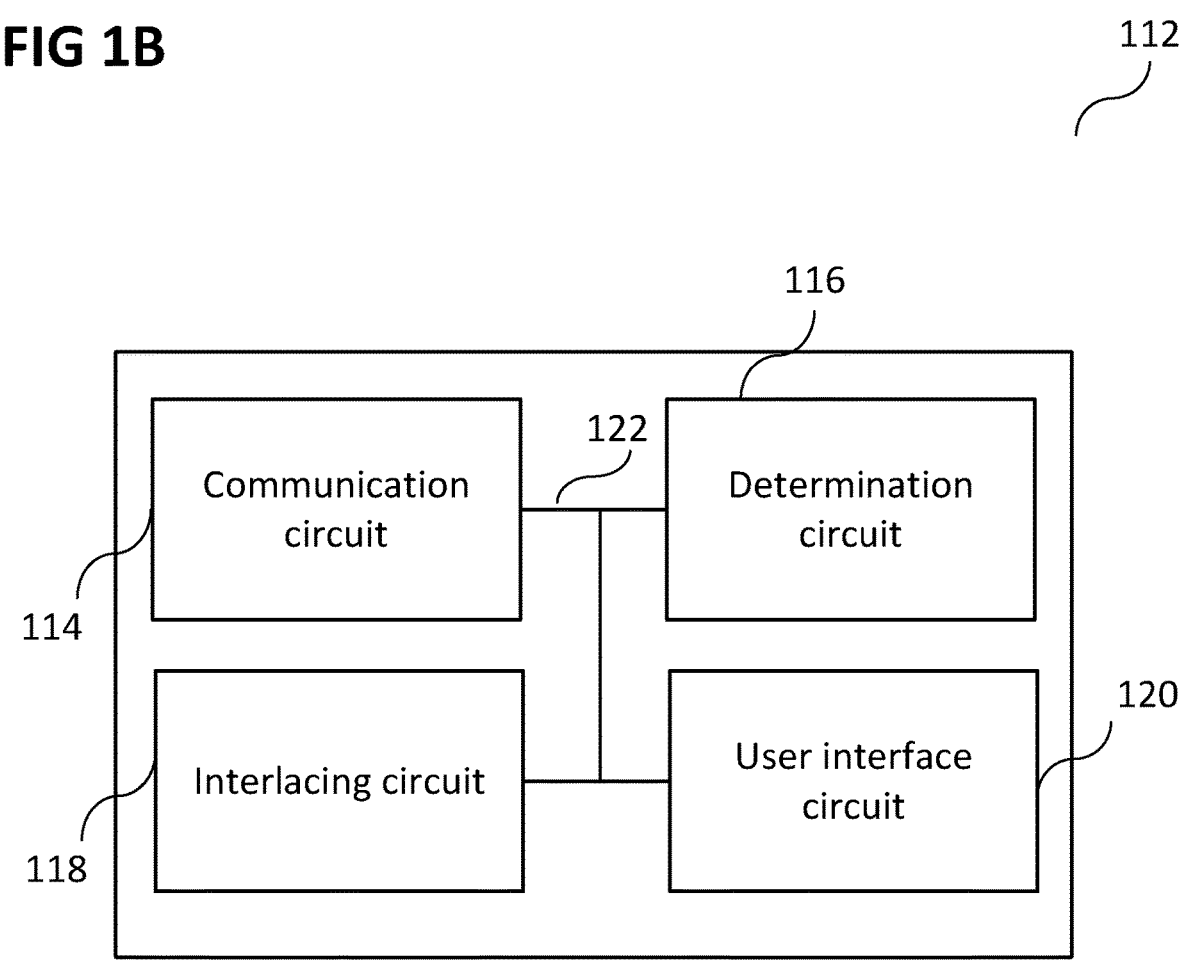
FIG. 1B shows an interlacing device according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the interlacing device as described in this description may include a memory which is for example used in the processing carried out in the interlacing device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

When using chat applications, users face several problems. For example, while watching multiple streams that have individual chat channels, a user must switch between windows to read all the chats. Furthermore, while simulcasting on multiple services, a broadcaster may wish to interact with all audiences. According to various embodiments, improved chat applications may be provided.

According to various embodiments, devices and methods may allow a user to interlace chats so that he/she can read and respond easily to multiple channels or multiple services.

According to various embodiments, devices and methods for interlaced chat may be provided.

According to various embodiments, devices and methods may be provided for viewing and responding to multiple chat services.

According to various embodiments, devices and methods may be provided so that a broadcaster who is streaming to multiple services may read/respond to all chat channels.

According to various embodiments, devices and methods may be provided so that a viewer who is watching multiple players in the same game may communicate with all players/streams.

According to various embodiments, device and methods may be provided for interlacing multiple chats to allow a user and broadcaster merge and manage multiple chat channels.

According to various embodiments, devices and methods may be provided for merging multiple chats from different providers into one user interface.

FIG. 1A shows a flow diagram 100 illustrating an interlacing method according to various embodiments. In 102, first data may be received from a first streaming service. In 104, second data may be received from a second streaming service. In 106, duplicates in the first data and the second data may be determined. In 108, interlaced data may be provided based on the first data and the second data free (in other words: without) from the duplicates (in other words: with the duplicates removed). In 110, the interlaced data may be output.

In other words, duplicates in data provided by different chat services may be identified and removed, and combined data without the duplicates may be output.

According to various embodiments, the first streaming service may be a first chat service, and the second streaming service may be a second chat service (which may for example be different from the first chat service).

According to various embodiments, the first chat service may be associated to a first video stream, and the second chat service may be associated to a second video stream.

According to various embodiments, the first streaming service may use a first service protocol, and the second streaming service may use a second service protocol (which may for example be different from the first service protocol).

According to various embodiments, the first streaming service may use a first time signature, and the second streaming service may use a second time signature (which may for example be different from the first time signature).

According to various embodiments, the duplicates may be determined based on the first time signature and the second time signature.

According to various embodiments, the duplicates may be determined based on a history of the first data and a history of the second data.

According to various embodiments, the duplicates may be determined based on recipients of the first streaming service and recipients of the second streaming service.

According to various embodiments, the interlacing method may further include: receiving input data; and transmitting the input data to at least one of the first streaming service and the second streaming service.

According to various embodiments, the interlacing method may further include: receiving an indication of a target including the first streaming service only, the second streaming service only, or both the first streaming service and the second streaming service; and transmitting the input data to the target based on the indication.

According to various embodiments, a (for example non-transitory) computer-readable medium may be provided and may include instructions which, when executed by a computer, make the computer perform an interlacing method, the interlacing method including: receiving first data from a first streaming service; receiving second data from a second streaming service; determining duplicates in the first data and the second data; providing interlaced data based on the first data and the second data free from the duplicates; and outputting the interlaced data.

According to various embodiments, the first streaming service may be a first chat service, and the second streaming service may be a second chat service.

According to various embodiments, the first chat service may be associated to a first video stream, and the second chat service may be associated to a second video stream.

According to various embodiments, the first streaming service may use a first service protocol, and the second streaming service may use a second service protocol.

According to various embodiments, the first streaming service may use a first time signature, and the second streaming service may use a second time signature.

According to various embodiments, the duplicates may be determined based on the first time signature and the second time signature.

According to various embodiments, the duplicates may be determined based on a history of the first data and a history of the second data.

According to various embodiments, the duplicates may be determined based on recipients of the first streaming service and recipients of the second streaming service.

According to various embodiments, the interlacing method may further include: receiving input data; and transmitting the input data to at least one of the first streaming service and the second streaming service.

According to various embodiments, the interlacing method may further include: receiving an indication of a target including the first streaming service only, the second streaming service only, or both the first streaming service and the second streaming service; and transmitting the input data to the target based on the indication.

FIG. 1B shows an interlacing device 112 according to various embodiments. The interlacing device 112 may include a communication circuit 114 configured to receive first data from a first streaming service and to receive second data from a second streaming service. The interlacing device 112 may further include a determination circuit 116 configured to determine duplicates in the first data and the second data. The interlacing device 112 may further include an interlacing circuit 118 configured to provide interlaced data based on the first data and the second data free from the duplicates. The interlacing device 112 may further include a user interface circuit 120 configured to output the interlaced data. The communication circuit 114, the determination circuit 116, the interlacing circuit 118, and the user interface circuit 120 may be coupled with each other, like indicated by lines 122, for example electrically coupled, for example using a line or a cable, and/or mechanically coupled.

According to various embodiments, the first streaming service may be a first chat service, and the second streaming service may be a second chat service.

According to various embodiments, the first chat service may be associated to a first video stream, and the second chat service may be associated to a second video stream.

According to various embodiments, the first streaming service may use a first service protocol, and the second streaming service may use a second service protocol.

According to various embodiments, the first streaming service may use a first time signature, and the second streaming service may use a second time signature.

According to various embodiments, the determination circuit 116 may be configured to determine the duplicates based on the first time signature and the second time signature.

According to various embodiments, the determination circuit 116 may be configured to determine the duplicates based on a history of the first data and a history of the second data.

According to various embodiments, the determination circuit 116 may be configured to determine the duplicates based on recipients of the first streaming service and recipients of the second streaming service.

According to various embodiments, the user interface circuit 120 may be configured to receive input data, and the communication circuit 114 may be configured to transmit the input data to at least one of the first streaming service and the second streaming service.

According to various embodiments, the user interface circuit 120 may be configured to receive an indication of a target including the first streaming service only, the second streaming service only, or both the first streaming service and the second streaming service; and the communication circuit 114 may be configured to transmit the input data to the target based on the indication.

In the following, a use-case scenario for a situation where, while watching multiple streams that have individual chat channels, a user must switch between windows to read all the chats, will be described.

Jane and Joe are playing a head to head game of Call of Duty. They are both streaming video to individual channels of a website. Each Channel has an individual chat window.

Bruce is a viewer, and is watching both streams, and chatting in both chat windows. He often wants to say the same thing in both chats. Bruce uses a device or method according to various embodiments (for example a Razer chat interlacing software) to pull both chats into one window. He is now able to see both chats, and respond to one or both chats at the same time.

FIG. 2 shows an illustration 200 of a user interface for a chat application according to various embodiments. A first tab 202 related to a first chat channel may be provided, and a second tab 204 related to a second chat channel may be provided. In a message list 206, all messages from the first chat may be provided in the same color as tab 202. In 206, all messages from the second chat may be the same color as tab 204. This may allow the user to determine what messages were sent to what channels in the unified chat 206. Closing tab 202 may remove all messages from the channel corresponding to the first chat from 206. The same may occur when tab 204 and messages in the second chat are closed. Messages for botch the first chat channel and the second chat channel may be displayed in the message list 206. According to various embodiments, the messages from the various chat channels may be distinguished by a background color of the messages. The background color may be identical to the color of the respective tab 202, 204.

An input field 214 may be provided, and input provided in the input field 214 may be sent by clicking on a send button 216. Various tabs may be provided for selecting to which chat channel an input is sent: a global tab 208 may be used for sending to all chat channels (for example to the first chat channel and the second chat channel); a further tab 210 may be used for sending to the first chat channel; and yet a further tab 212 may be used for sending to the second chat channel.

Figure 3:
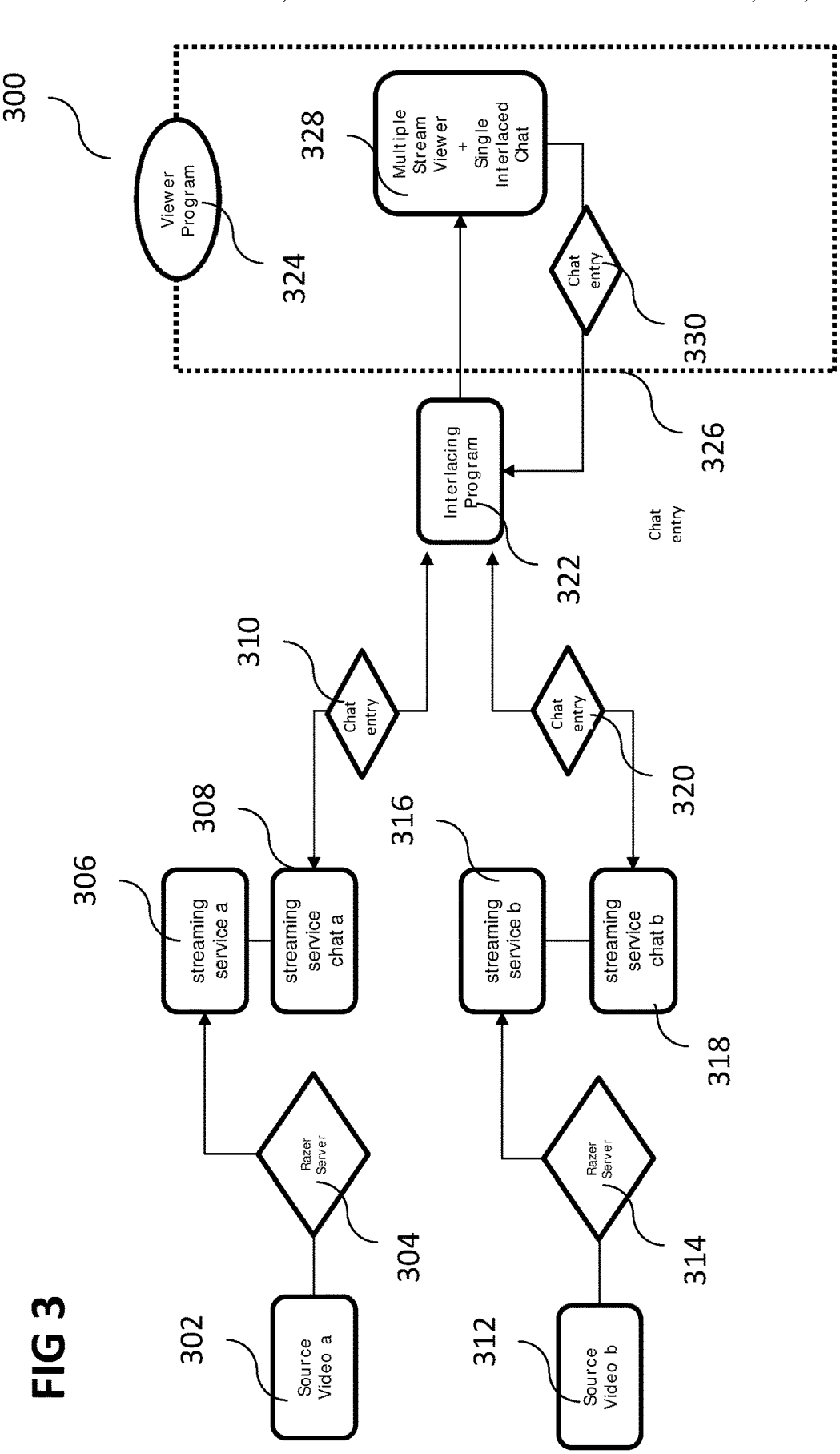
FIG. 3 shows an illustration according to various embodiments for a situation where, while watching multiple streams that have individual chat channels, a user must switch between windows to read all the chats.

FIG. 3 shows an illustration 300 according to various embodiments for a situation where, while watching multiple streams that have individual chat channels, a user must switch between windows to read all the chats. A first video source 302 (which may for example be referred to as source video a, and which may be data from a hardware) may provide video data to a first server 304 (for example a Razer server, which may be provided by software and/or hardware), which may broadcast a first video stream 306 (which may be an example for a streaming service, and which may be referred to as streaming service a and which may be provided by software); a first chat 308 (which may be referred to as streaming service chat a and which may be provided by software) may be associated with the first video stream 306. A second video source 312 (which may for example be referred to as source video b, and which may be data from a hardware) may provide further video data to a second server 314 (for example a Razer server, which may be provided by software), which may be different from the first server 304, and which may broadcast a second video stream 316 (which may be an example of a streaming service, and which may be referred to as streaming service b and which may be provided by software); a second chat 318 (which may be referred to as streaming service chat b and which may be provided by software) may be associated with the second video stream 316. The first chat 308 may be forwarded to an interlacing program 322, like indicated by 310. The second chat 318 may also be forwarded to the interlacing program 322, like indicated by 320. The interlacing program 322 may detect and combine duplicate entries by the same user (for example entries which are both present in the first chat and in the second chat) into one entry for ease of reading. A viewer program 324 (like also indicated by dashed box 326) may include a multiple stream viewer 328, which may provide a single interlaced chat. A user may input messages to the viewer 328, and these messages may be forwarded to the interlacing program 322 (like indicated by 330).

In the following, a use case scenario as follows will be described. Bruce is playing Call of Duty on PC. Bruce is broadcasting on 2 services with 2 separate chat services at the same time. Bruce wants to observe and respond to both chat channels at the same time so he can communicate with all of his viewers. Bruce uses the razer chat interlacing software to pull both chats into one window. He is now able to see both chats, and respond to one or both chats at the same time.

Figure 4:
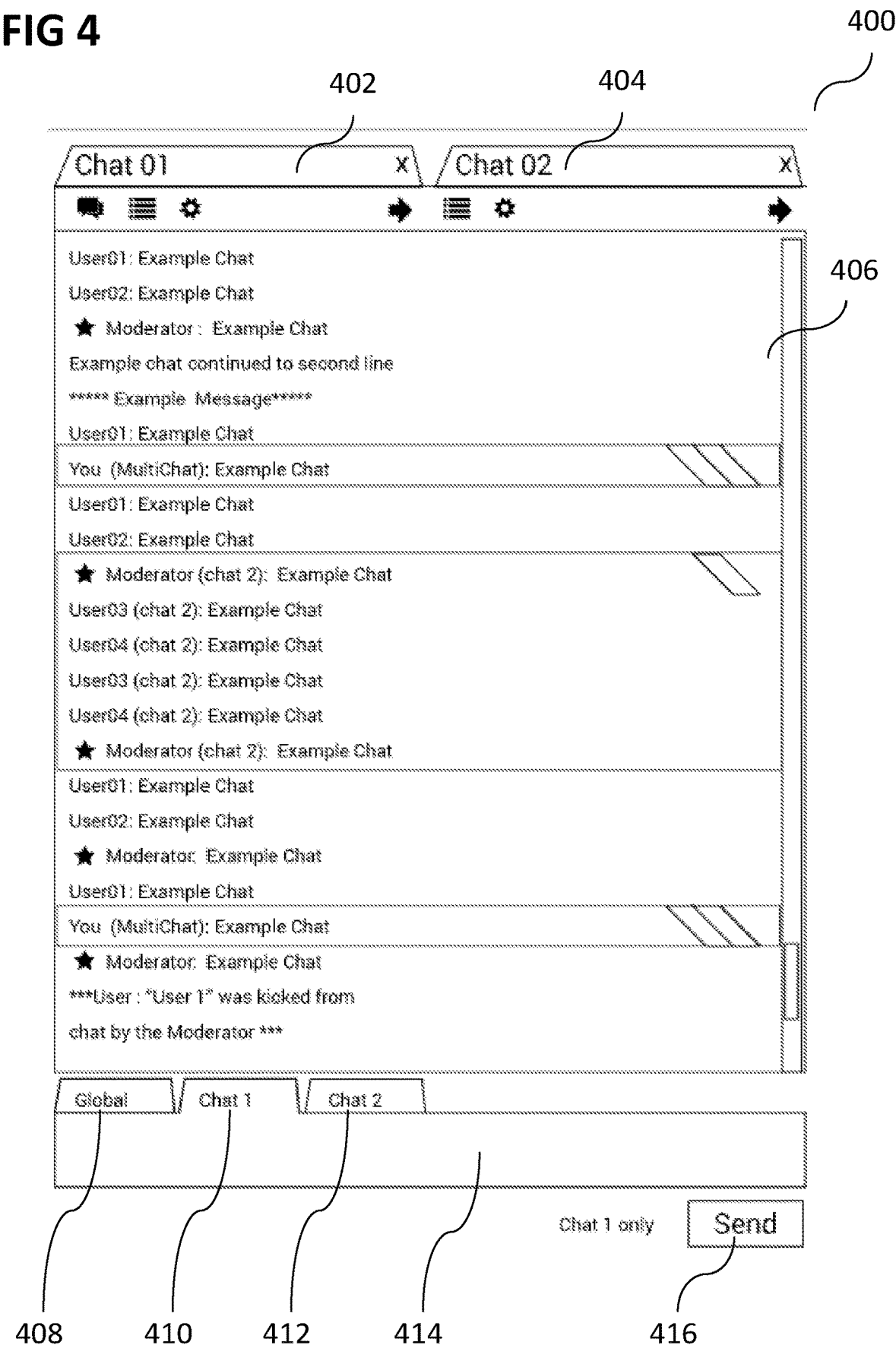
FIG. 4 shows a screen shot according to the use case scenario according to various embodiments.

FIG. 4 shows a screen shot 400 according to the use case scenario according to various embodiments. A first tab 402 related to a first chat channel may be provided, and a second tab 404 related to a second chat channel may be provided. Messages for botch the first chat channel and the second chat channel may be displayed in a message list 406. According to various embodiments, the messages from the various chat channels may be distinguished by a background color of the messages. The background color may be identical to the color of the respective tab 402, 404.

An input field 414 may be provided, and input provided in the input field 414 may be sent by clicking on a send button 416. Various tabs may be provided for selecting to which chat channel an input is sent: a global tab 408 may be used for sending to all chat channels (for example to the first chat channel and the second chat channel); a further tab 410 may be used for sending to the first chat channel; and yet a further tab 412 may be used for sending to the second chat channel.

Figure 5:
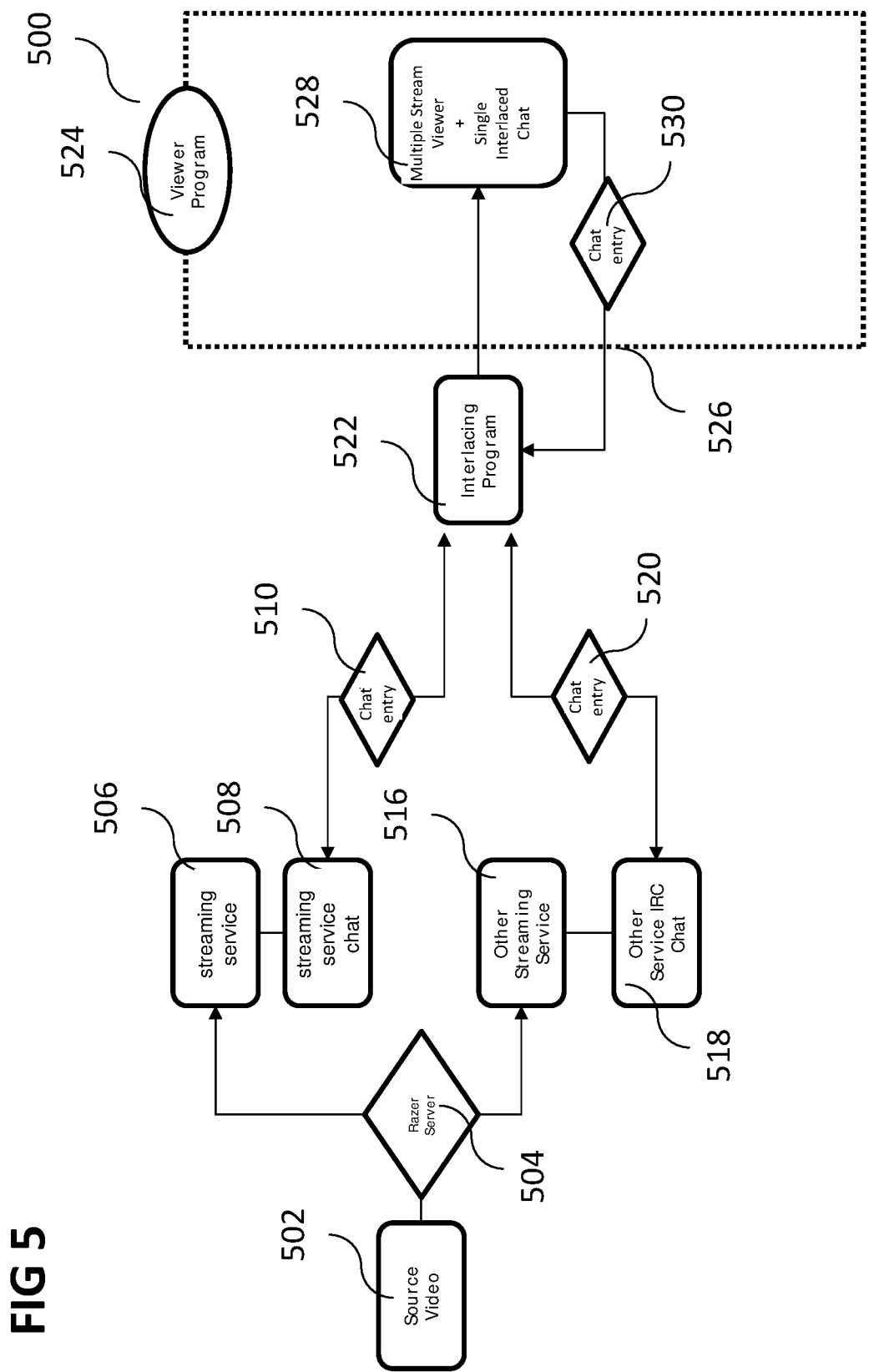
FIG. 5 shows an illustration for the use case according to various embodiments.

FIG. 5 shows an illustration 500 for the use case according to various embodiments. A video source 502 (which may be data from a hardware) may provide video data to a server 504 (for example a Razer server, which may be implemented in hardware and/or software), which may broadcast a first video stream 506 (which may be an example for a streaming service, and which may be implemented in software) and a second video stream 516 (which may for example employ a different streaming service then the streaming service which is used for the first video stream 506). A first chat 508 (which may be referred to as streaming service chat, and which may be implemented in software) may be associated with the first video stream 506. A second chat 518 (which may employ a chat service different from the chat service used for the first chat 508, and which may be implemented in software) may be associated with the second video stream 516, which may be implemented in software. The first chat 508 may be forwarded to an interlacing program 522, like indicated by 510. The second chat 518 may also be forwarded to the interlacing program 522, like indicated by 520. The interlacing program 522 may detect and combine duplicate entries by the same user (for example entries which are both present in the first chat and in the second chat) into one entry for ease of reading. A viewer program 524 (like also indicated by dashed box 526) may include a multiple stream viewer 528, which may provide a single interlaced chat. A user may input messages to the viewer 528 (which may be implemented in software), and these messages may be forwarded to the interlacing program 522 (like indicated by 530), and may be further forwarded to both the first chat 508 and the second chat 518.

FIG. 6 shows an illustration 600 of a structure of an interlacing program according to various embodiments. A program 606 may be able to send and receive messages from a range of disparate instant message services (for example a first chat service 206 and a second chat service 604) and may utilize APIs (application programming interfaces) from each service. The program may output a first chat log 608 and a second chat log 610, and may compare logs for duplication (like illustrated in 612). For example, interlacing of messages provided by different chat services and protocols into one unified chat service may be provided. Each protocol may have different methods of determining the timing of the message (which may be determined by when the message reaches the streamer or when the message is sent by an audience member). Contextual comparison of chat messages may be used, including time stamp, text content, and preceding messages in log to determine a confidence level for merger of duplicate chat messages. Like illustrated in 614, de-duplicate information (in other words: information with duplicates removed) may be added to a merged (in other words: interlaced) log. The program may carefully structure (or study or analyze or determine) how the chat log is stored to resolve duplicate messages between channels and to quickly merge/un-merge chat windows. These duplicate messages between channels may be resolved both in real-time and for the entire chat log of both channels upon a channel merge. The merged chat (in other words: the merged log) may be output, like illustrated in 616. It may be determined if a message is sent to multiple channels and such a message may be displayed only once in a unified chat if that is the case.

Figure 7A:
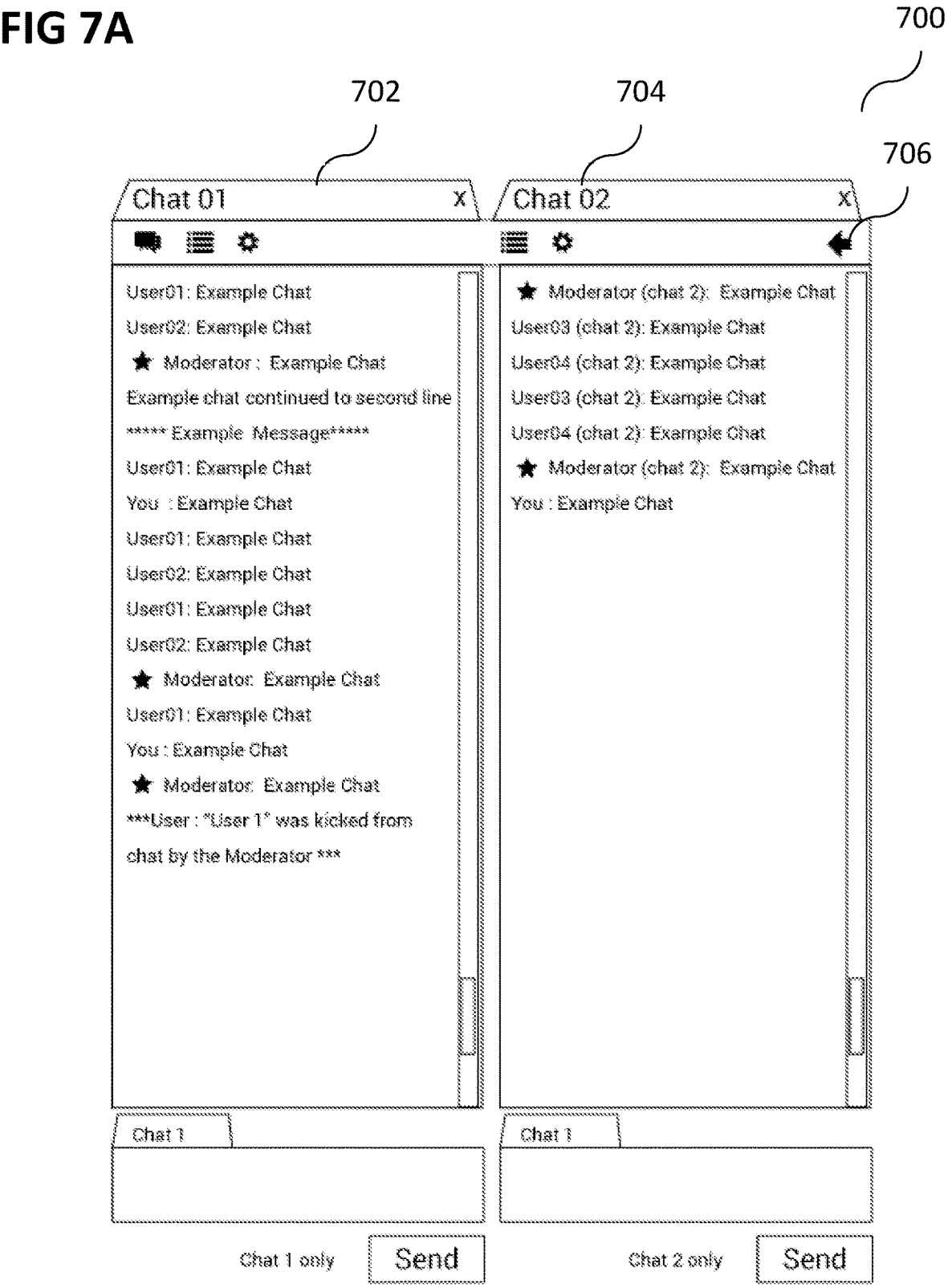
FIG. 7A and FIG. 7B show illustrations of a method for interlacing chat with multiple chat channels in a single chat window according to various embodiments.
Figure 7B:
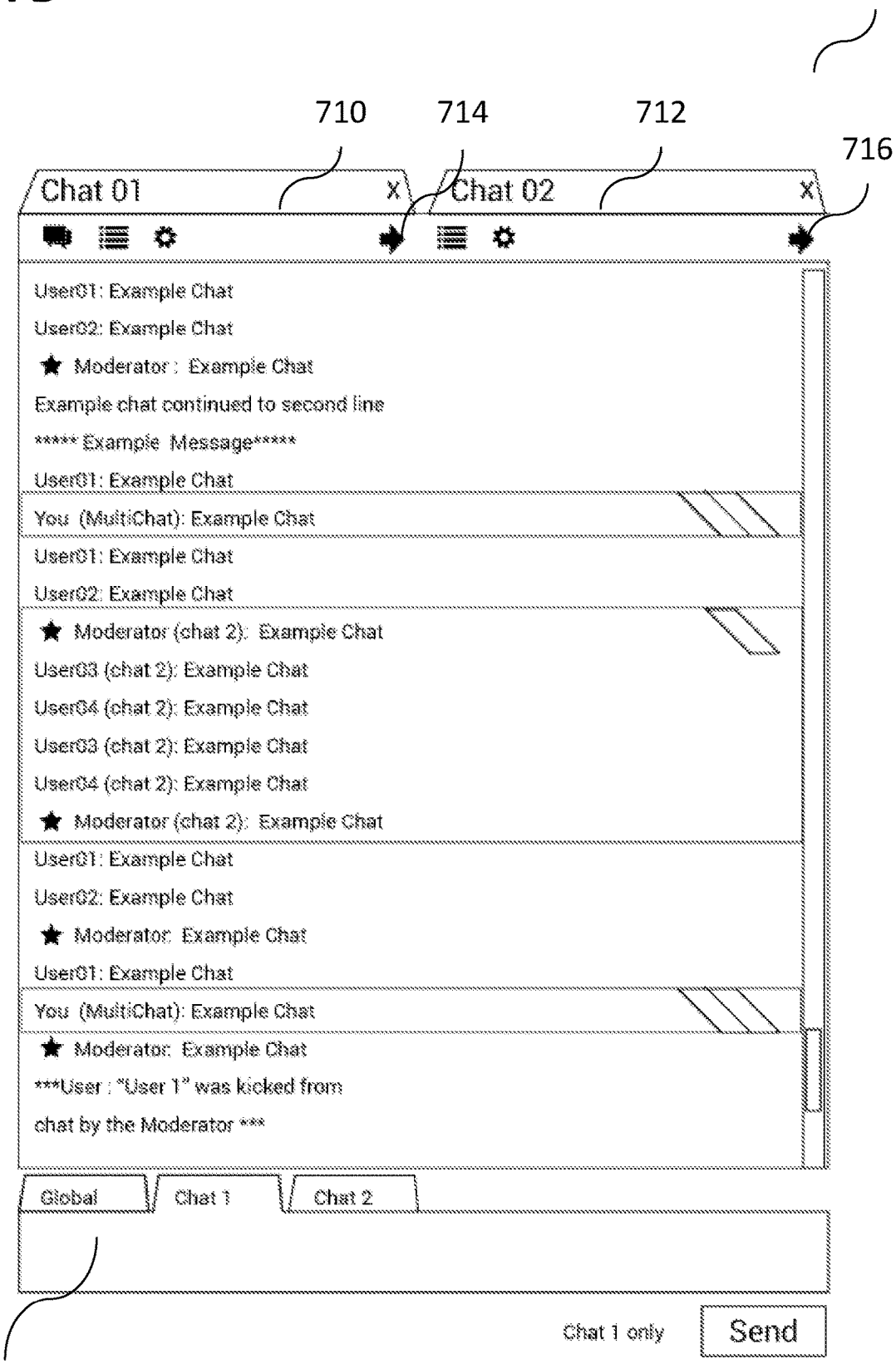

FIG. 7A and FIG. 7B show illustrations 700 and 708 of a method for interlacing chat with multiple chat channels in a single chat window according to various embodiments. In other words, FIG. 7A and FIG. 7B illustrate how individual chats may be combined according to various embodiments. In FIG. 7A, a first chat window 702 and a second chat window 704 are shown. These individual chat windows may have a combine tool 706 that lets the user interlace the chat. For example, upon using the combine tool 706 (for example clicking on the arrow as illustrated in FIG. 7A), the user interface may change to what is shown in FIG. 7B. A first tab 710 related to the chat which was previously displayed by the first chat window 702, and a second tab 712 related to the chat which was previously displayed by the second chat window 704 may be provided, and the chat may be shown in a common window in an interlaced form. A first arrow 714 may be provided, which may be used to exclude the chat related to the first tab 710 from the interlaced view. A second arrow 716 may be provided, which may be used to exclude the chat related to the second tab 712 from the interlaced view. Typing in the global chat 718 may post to all channels (in other words: in all chats).

Figure 8A:
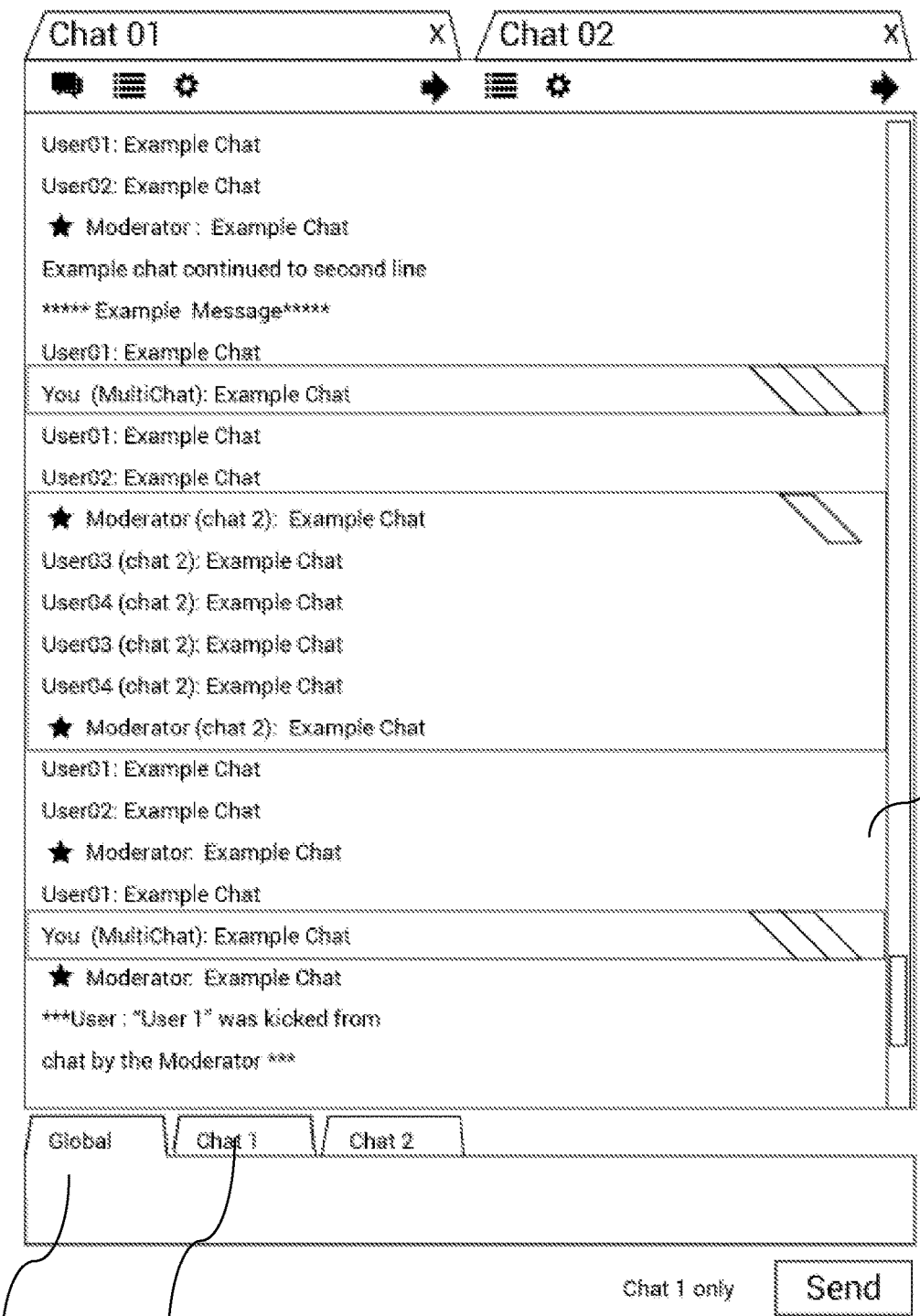
FIG. 8A and FIG. 8B show illustrations for a single chat response according to various embodiments.
Figure 8B:
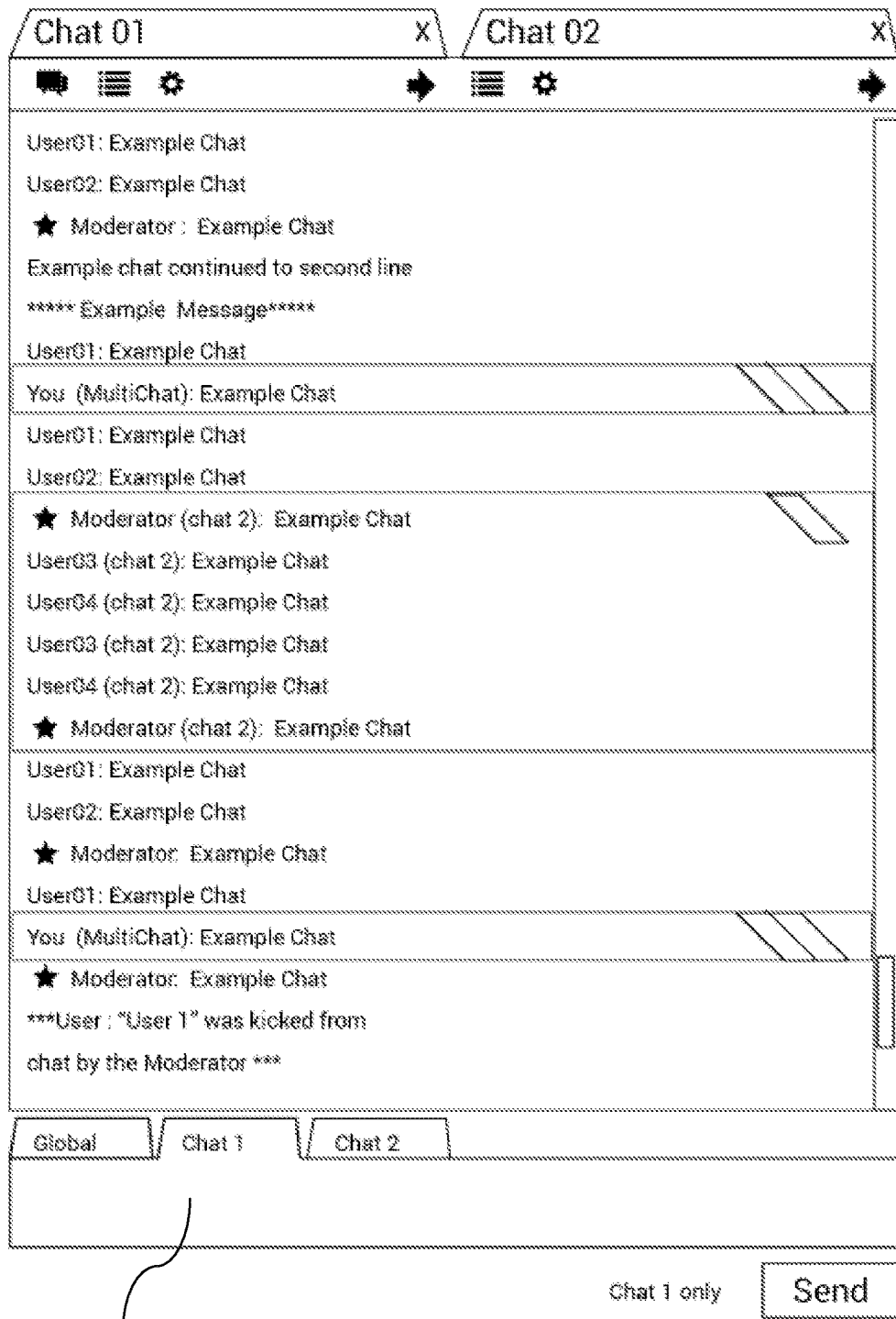

FIG. 8A and FIG. 8B show illustrations 800 and 808 for a single chat response according to various embodiments. Like illustrated in FIG. 8A, in a state in which the global input (in other words: input to all chats) is active like illustrated by 802 (for example corresponding to the global chat 718 shown in FIG. 7B, selecting an individual stream (by selecting the corresponding input tab 804) or tapping on a message 806 from the on the corresponding stream lets a user chat only with that stream, and like shown in FIG. 8B by 810, the input field may change accordingly.

Figure 9A:
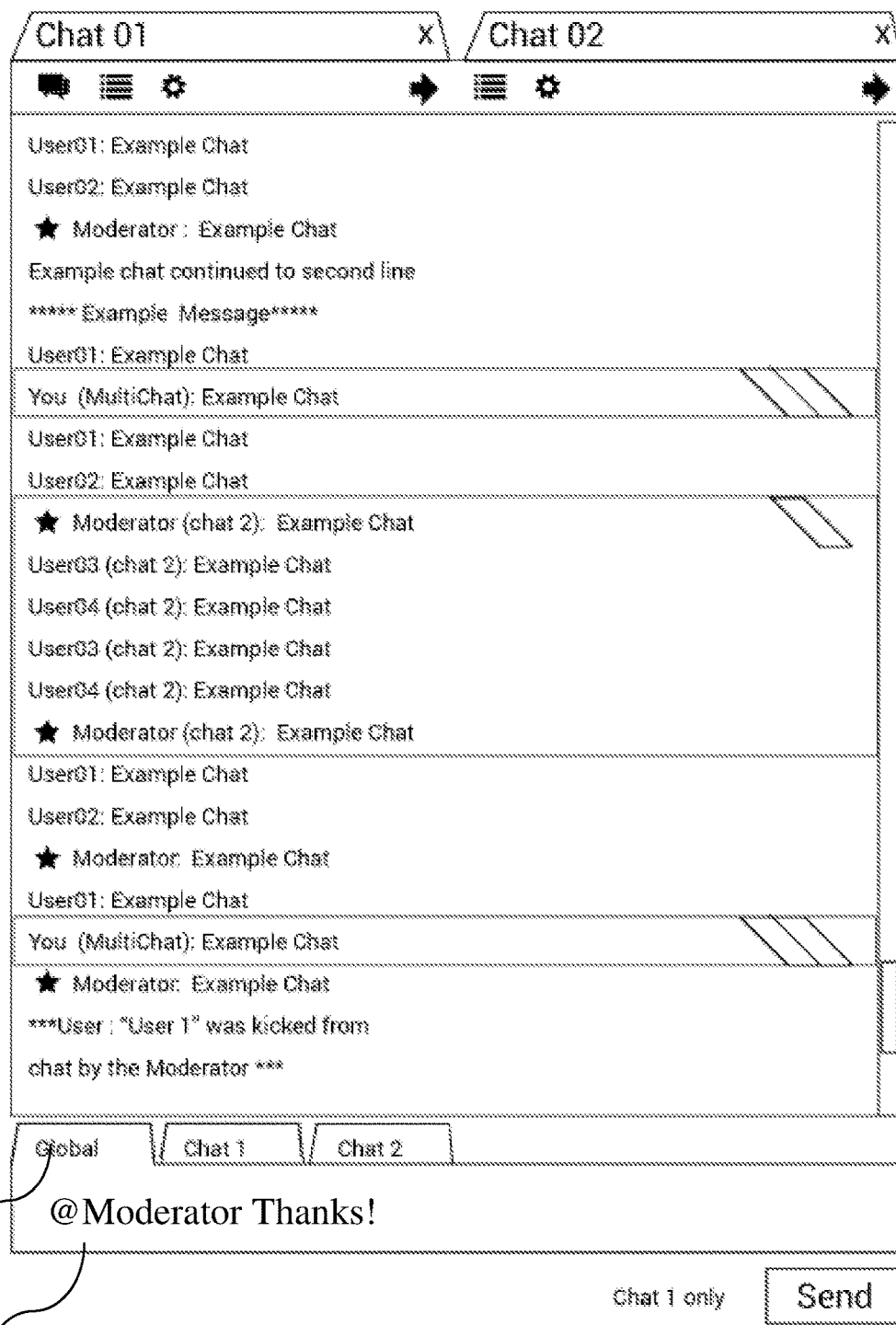
FIG. 9A and FIG. 9B show illustrations of responding to individuals according to various embodiments.
Figure 9B:
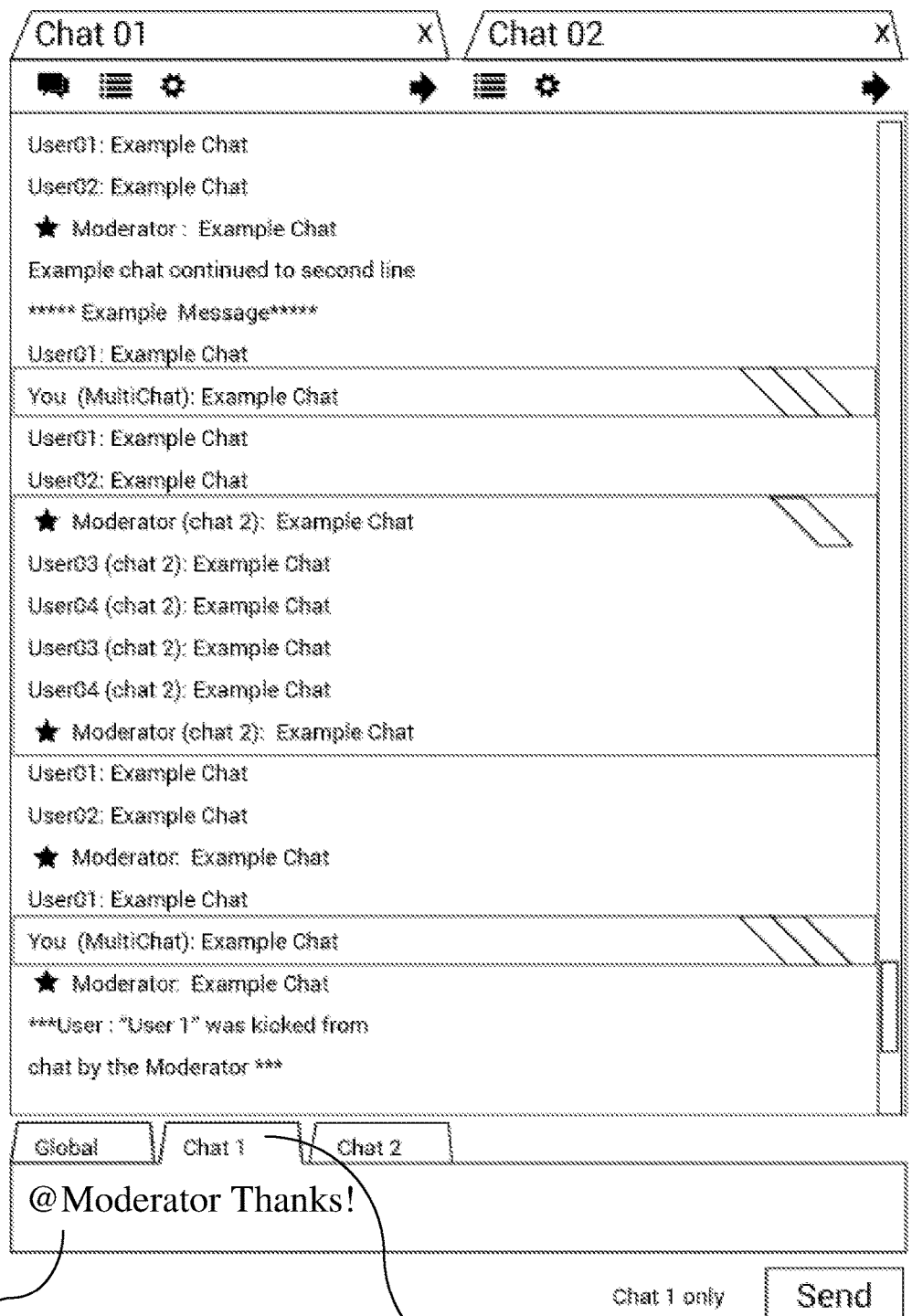

FIG. 9A and FIG. 9B show illustrations 900 and 904 of responding to individuals according to various embodiments. Like illustrated in FIG. 9A, in a state in which the global input (in other words: input to all chats) is active like illustrated by 902 (for example corresponding to the global chat 718 shown in FIG. 7B), by responding to an individual with @username like illustrated by 902 may respond only to the chat that the user is in, and like shown in FIG. 9B by 906, the input field may change accordingly.

Figure 10A:
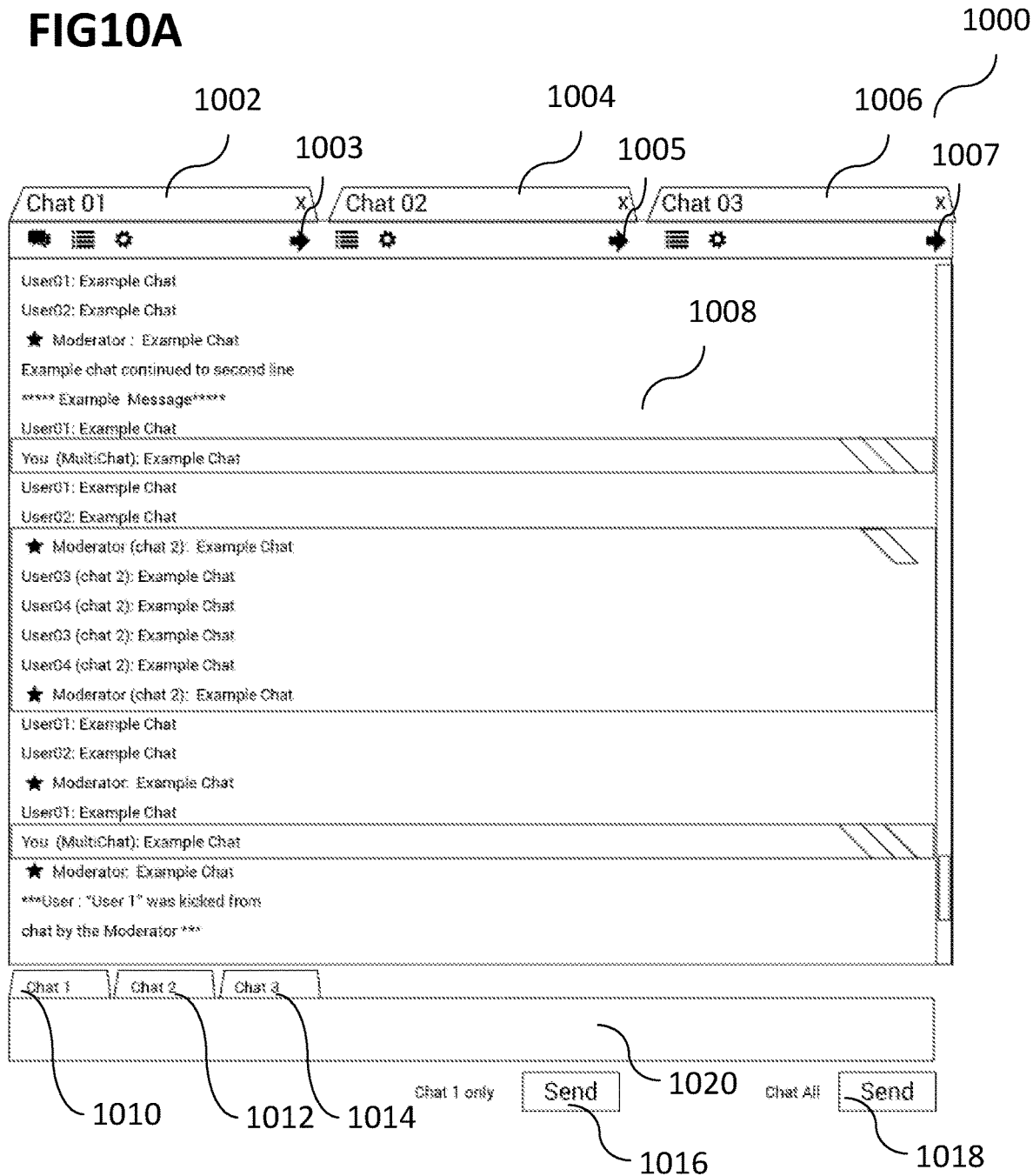
FIGS. 10A and 10B show illustrations of a chat window combining a plurality of chats.

FIG. 10A shows an illustration 1000 of a chat window combining a plurality of chats. A first window tab 1002 corresponding to a first chat, a second window tab 1004 corresponding to a second chat, and a window tab 1006 corresponding to a third chat may be provided. Closing the respective window tab may end the respective chat (so that for example no new messages of the respective chat are received and/or old messages of the respective chat are removed from the message list 1008, in which messages from all chats are interleaved). A first arrow 1003 corresponding to the first chat, a second arrow 1005 corresponding to the second chat, and a third arrow 1007 corresponding to the third chat may be provided. Clicking on the respective arrow may remove the corresponding chat from the combined window into a separate window or into a separate sub-window, like illustrated in FIG. 10B. An input field 1020 for inputting messages to the respective chats may be provided. Depending on which selection tab (out of a first selection tab 1010 corresponding to the first chat, a second selection tab 1012 corresponding to the second chat, and a third selection tab 1014 corresponding to the third chat) is selected, a first click button 1016 may send the message input into the input field 1020 only to the selected chat (for example only to the first chat is the first selection tab 1010 is selected). A further click button 1018 may send the message input into the input field to all chats.

Figure 10B:
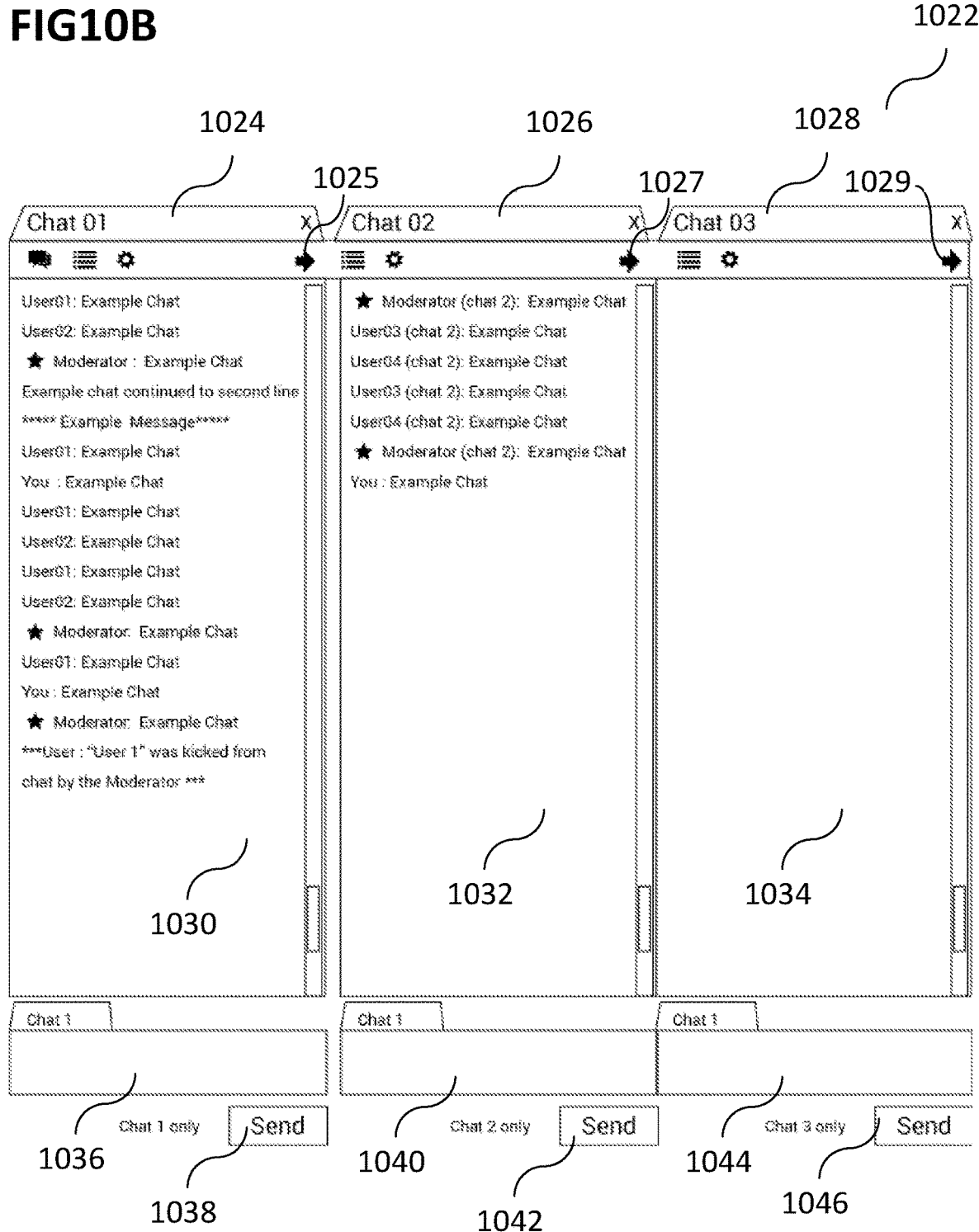

FIG. 10B shows an illustration 1022 of a chat window with a plurality of chats in parallel. A first window tab 1024 corresponding to a first chat, a second window tab 1026 corresponding to a second chat, and a window tab 1028 corresponding to a third chat may be provided. A first arrow 1025 corresponding to the first chat, a second arrow 1027 corresponding to the second chat, and a third arrow 1029 corresponding to the third chat may be provided. A separate message list may be provided for each chat. A first message list 1030 for the first chat, a second message list 1032 for the second chat, and a third message list 1034 for the third chat may be provided. Clicking on the respective arrow may remove the corresponding chat from the window into a separate window. A first input field 1036 for inputting messages to the first chat may be provided. A first click button 1038 may send the message input into the first input field 1036 only to the first chat. A second input field 1040 for inputting messages to the second chat may be provided. A second click button 1042 may send the message input into the second input field 1040 only to the second chat. A third input field 1044 for inputting messages to the third chat may be provided. A third click button 1046 may send the message input into the third input field 1046 only to the third chat.

It will be understood that although the above figures describe various embodiments with a predetermined number of chats, various embodiments may be applied to any number of chats, and the number of chats may change during operation (for example new chats may be added and/or existing chats may be removed).

According to various embodiments, real time synchronous interlacing chat of disparate broadcast/streaming services using different service protocols and time signature may be provided. According to various embodiments, in game display and response to said multiple disparate systems may be provided.

The following examples pertain to further embodiments.

Example 1 is an interlacing method comprising: receiving first data from a first streaming service; receiving second data from a second streaming service; determining duplicates in the first data and the second data; providing interlaced data based on the first data and the second data free from the duplicates; and outputting the interlaced data.

In example 2, the subject-matter of example 1 can optionally include that the first streaming service is a first chat service, and that the second streaming service is a second chat service.

In example 3, the subject-matter of any one of examples 1 to 2 can optionally include that the first chat service is associated to a first video stream, and that the second chat service is associated to a second video stream.

In example 4, the subject-matter of any one of examples 1 to 3 can optionally include that the first streaming service uses a first service protocol, and that the second streaming service uses a second service protocol.

In example 5, the subject-matter of any one of examples 1 to 4 can optionally include that the first streaming service uses a first time signature, and that the second streaming service uses a second time signature.

In example 6, the subject-matter of example 5 can optionally include that the duplicates are determined based on the first time signature and the second time signature.

In example 7, the subject-matter of any one of examples 1 to 6 can optionally include that the duplicates are determined based on a history of the first data and a history of the second data.

In example 8, the subject-matter of any one of examples 1 to 7 can optionally include that the duplicates are determined based on recipients of the first streaming service and recipients of the second streaming service.

In example 9, the subject-matter of any one of examples 1 to 8 can optionally include: receiving input data; and transmitting the input data to at least one of the first streaming service and the second streaming service.

In example 10, the subject-matter of example 9 can optionally include: receiving an indication of a target comprising the first streaming service only, the second streaming service only, or both the first streaming service and the second streaming service; and transmitting the input data to the target based on the indication.

Example 11 is a computer-readable medium comprising instructions which, when executed by a computer, make the computer perform an interlacing method, the interlacing method comprising: receiving first data from a first streaming service; receiving second data from a second streaming service; determining duplicates in the first data and the second data; providing interlaced data based on the first data and the second data free from the duplicates; and outputting the interlaced data.

In example 12, the subject-matter of example 11 can optionally include that the first streaming service is a first chat service, and that the second streaming service is a second chat service.

In example 13, the subject-matter of example 12 can optionally include that the first chat service is associated to a first video stream, and that the second chat service is associated to a second video stream.

In example 14, the subject-matter of any one of examples 11 to 13 can optionally include that the first streaming service uses a first service protocol, and that the second streaming service uses a second service protocol.

In example 15, the subject-matter of any one of examples 11 to 14 can optionally include that the first streaming service uses a first time signature, and that the second streaming service uses a second time signature.

In example 16, the subject-matter of example 15 can optionally include that the duplicates are determined based on the first time signature and the second time signature.

In example 17, the subject-matter of any one of examples 11 to 16 can optionally include that the duplicates are determined based on a history of the first data and a history of the second data.

In example 18, the subject-matter of any one of examples 11 to 17 can optionally include that the duplicates are determined based on recipients of the first streaming service and recipients of the second streaming service.

In example 19, the subject-matter of any one of examples 11 to 18 can optionally include: receiving input data; and transmitting the input data to at least one of the first streaming service and the second streaming service.

In example 20, the subject-matter of example 19 can optionally include: receiving an indication of a target comprising the first streaming service only, the second streaming service only, or both the first streaming service and the second streaming service; and transmitting the input data to the target based on the indication.

Example 21 is an interlacing device comprising: a communication circuit configured to receive first data from a first streaming service and to receive second data from a second streaming service; a determination circuit configured to determine duplicates in the first data and the second data; an interlacing circuit configured to provide interlaced data based on the first data and the second data free from the duplicates; and a user interface circuit configured to output the interlaced data.

In example 22, the subject-matter of example 21 can optionally include that the first streaming service is a first chat service, and that the second streaming service is a second chat service.

In example 23, the subject-matter of example 22 can optionally include that the first chat service is associated to a first video stream, and that the second chat service is associated to a second video stream.

In example 24, the subject-matter of any one of examples 21 to 23 can optionally include that the first streaming service uses a first service protocol, and that the second streaming service uses a second service protocol.

In example 25, the subject-matter of any one of examples 21 to 24 can optionally include that the first streaming service uses a first time signature, and that the second streaming service uses a second time signature.

In example 26, the subject-matter of example 25 can optionally include that the determination circuit is configured to determine the duplicates based on the first time signature and the second time signature.

In example 27, the subject-matter of any one of examples 21 to 26 can optionally include that the determination circuit is configured to determine the duplicates based on a history of the first data and a history of the second data.

In example 28, the subject-matter of any one of examples 21 to 27 can optionally include that the determination circuit is configured to determine the duplicates based on recipients of the first streaming service and recipients of the second streaming service.

In example 29, the subject-matter of any one of examples 21 to 28 can optionally include that the user interface circuit is configured to receive input data, and that the communication circuit is configured to transmit the input data to at least one of the first streaming service and the second streaming service.

In example 30, the subject-matter of example 29 can optionally include that the user interface circuit is configured to receive an indication of a target comprising the first streaming service only, the second streaming service only, or both the first streaming service and the second streaming service, and that the communication circuit is configured to transmit the input data to the target based on the indication.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An interlacing method comprising:
   receiving first chat data from a first streaming service;
   receiving second chat data from a second streaming service;
   determining duplicates in the first chat data and the second chat data by comparing contextual information accompanying the first and second chat data;
   providing interlaced data based on the first chat data and the second chat data free from the duplicates; and
   selectably outputting the interlaced data, the first chat data and/or the second chat data for display on a real-time basis together with interactive video streaming provided by the first streaming service and the second streaming service.

2. The interlacing method of claim 1,
   wherein the first streaming service further comprises a first chat service;
   wherein the second streaming service further comprises a second chat service; and
   wherein determining duplicates uses contextual comparison of the accompanying information comprising time stamps, text content and preceding messages in logs from the respective first and second data.

3. The interlacing method of claim 1,
   wherein the first streaming service uses at least one of a first service protocol and a first time signature; and
   wherein the second streaming service uses at least one of a second service protocol and a second time signature.

4. The interlacing method of claim 3,
   wherein the first streaming service uses the first time signature;
   wherein the second streaming service uses the second time signature; and
   wherein the duplicates are determined based on the first time signature and the second time signature.

5. The interlacing method of claim 1,
   wherein the duplicates are determined based on at least one of:
      a history of the first chat data and a history of the second chat data; and
      recipients of the first streaming service and recipients of the second streaming service.

6. The interlacing method of claim 1, further comprising:
   receiving input data;

receiving an indication of a target comprising the first streaming service only, the second streaming service only, or both the first streaming service and the second streaming service; and transmitting the input data to the target based on the indication.

7. A non-transitory computer-readable medium comprising instructions which, when executed by a computer, make the computer perform an interlacing method, the interlacing method comprising:

receiving first chat data from a first streaming service;

receiving second chat data from a second streaming service;

determining duplicates in the first chat data and the second chat data by comparing contextual information accompanying the first and second chat data;

providing interlaced data based on the first chat data and the second chat data free from the duplicates; and selectably outputting the interlaced data, the first chat data and/or the second chat data for display on a real-time basis together with interactive video streaming provided by the first streaming service and the second streaming service.

8. The non-transitory computer-readable medium of claim 7, wherein the first streaming service further comprises a first chat service; and wherein the second streaming service further comprises a second chat service.

9. The non-transitory computer-readable medium of claim 7, wherein the first streaming service uses at least one of a first service protocol and a first time signature; and wherein the second streaming service uses at least one of a second service protocol and a second time signature.

10. The non-transitory computer-readable medium of claim 9, wherein the first streaming service uses the first time signature;

wherein the second streaming service uses the second time signature; and wherein the duplicates are determined based on the first time signature and the second time signature.

11. The non-transitory computer-readable medium of claim 7, wherein the duplicates are determined based on at least one of:

a history of the first chat data and a history of the second chat data; and recipients of the first streaming service and recipients of the second streaming service.

12. The non-transitory computer-readable medium of claim 7, wherein the interlacing method further comprises:

receiving input data;

receiving an indication of a target comprising the first streaming service only, the second streaming service only, or both the first streaming service and the second streaming service; and transmitting the input data to the target based on the indication.

13. An interlacing device comprising:

a communication circuit configured to receive first chat data from a first streaming service and to receive second chat data from a second streaming service;

a determination circuit configured to determine duplicates in the first chat data and the second chat data by comparing contextual information accompanying the first and second chat data;

an interlacing circuit configured to provide interlaced data based on the first chat data and the second chat data free from the duplicates; and a user interface circuit configured to selectably output the interlaced data, the first chat data and/or the second chat data for display on a real-time basis together with interactive video streaming provided by the first streaming service and the second streaming service.

14. The interlacing device of claim 13, wherein the first streaming service further comprises a first chat service; and wherein the second streaming service further comprises a second chat service.

15. The interlacing device of claim 13, wherein the first streaming service uses at least one of a first service protocol and a first time signature; and wherein the second streaming service uses a second service protocol and a second time signature.

16. The interlacing device of claim 15, wherein the first streaming service uses the first time signature;

wherein the second streaming service uses the second time signature; and wherein the determination circuit is configured to determine the duplicates based on the first time signature and the second time signature.

17. The interlacing device of claim 13, wherein the determination circuit is configured to determine the duplicates based on at least one of:

a history of the first chat data and a history of the second chat data; and recipients of the first streaming service and recipients of the second streaming service.

18. The interlacing device of claim 13, wherein the user interface circuit is configured to receive input data and an indication of a target comprising the first streaming service only, the second streaming service only, or both the first streaming service and the second streaming service; and wherein the communication circuit is configured to transmit the input data to the target based on the indication.

* * * * *